(12) United States Patent
Cordell et al.

(10) Patent No.: US 9,185,223 B1
(45) Date of Patent: *Nov. 10, 2015

(54) REAL TIME FEEDBACK OF SCRIPT LOGIC

(71) Applicant: West Corporation, Omaha, NE (US)

(72) Inventors: Jeffrey William Cordell, Omaha, NE (US); Anthony Mathew Stach, Omaha, NE (US)

(73) Assignee: Alorica Business Solutions, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/593,372

(22) Filed: Jan. 9, 2015

Related U.S. Application Data

(63) Continuation of application No. 14/160,814, filed on Jan. 22, 2014, now Pat. No. 8,938,065, which is a continuation of application No. 11/427,007, filed on Jun. 28, 2006, now Pat. No. 8,644,492.

(51) Int. Cl.
*H04M 3/00* (2006.01)
*H04M 3/523* (2006.01)
*H04M 3/51* (2006.01)

(52) U.S. Cl.
CPC ............ *H04M 3/523* (2013.01); *H04M 3/5175* (2013.01)

(58) Field of Classification Search
CPC ............ H04M 3/5175; H04M 3/5183; H04M 3/5191; H04M 3/5158; H04M 3/51
USPC ............ 379/265.01, 266.07–266.08
See application file for complete search history.

(56) References Cited

U.S. PATENT DOCUMENTS

| | | | | |
|---|---|---|---|---|
| 5,239,460 | A * | 8/1993 | LaRoche | 705/7.42 |
| 5,586,175 | A * | 12/1996 | Hogan et al. | 379/114.14 |
| 5,633,922 | A * | 5/1997 | August et al. | 379/221.01 |
| 6,070,142 | A * | 5/2000 | McDonough et al. | 705/7.14 |
| 6,449,358 | B1 * | 9/2002 | Anisimov et al. | 379/266.07 |
| 7,295,668 | B2 * | 11/2007 | Singer | 379/265.01 |
| 7,398,224 | B2 * | 7/2008 | Cooper | 705/7.37 |

* cited by examiner

*Primary Examiner* — Rasha Al Aubaidi

(57) ABSTRACT

A system, method, and computer readable medium for real time feedback of script logic that comprises counting at least one agent utilizing at least one panel associated with at least one caller, establishing an average length of time required to utilize the at least one panel associated with the at least one caller, tallying a number of callers terminating interaction during utilization of the at least one panel, calculating statistics associated with the counted agents per panel, the established average length of time required per panel and the tallied number of callers terminating interaction per panel, and displaying the calculated statistics.

20 Claims, 10 Drawing Sheets

REAL TIME FEEDBACK OF SCRIPT LOGIC

CROSS REFERENCE TO RELATED APPLICATIONS

The present patent application is a continuation from U.S. patent application Ser. No. 14/160,814, filed Jan. 22, 2014 and entitled REAL TIME FEEDBACK OF SCRIPT LOGIC, which is a continuation from U.S. patent application Ser. No. 11/427,007, filed Jun. 28, 2006 and entitled REAL TIME FEEDBACK OF SCRIPT LOGIC, now issued U.S. Pat. No. 8,644,492, which is related to U.S. patent application Ser. No. 11/427,013 entitled REMOTELY MONITORING CALL CENTER STATISTICS, filed Jun. 28, 2006, and U.S. patent application Ser. No. 11/427,010 entitled SESSION INITIATION PROTOCOL ENABLED AGENT DESKTOP ENVIRONMENT, filed Jun. 28, 2006, and U.S. patent application Ser. No. 11/427,009 entitled SCRIPT LOGIC GRAPHICAL MAPPING, filed Jun. 28, 2006, now issued U.S. Pat. No. 8,595,648, and U.S. patent application Ser. No. 11/427,008 entitled SCRIPT LOGIC VIEWING, filed on Jun. 28, 2006, and U.S. patent application Ser. No. 11/427,014 entitled CONTACT CENTER CALL ROUTING BY AGENT ATTRIBUTE filed on Jun. 28, 2006, now issued U.S. Pat. No. 8,559,618, the entire contents of which are incorporated by reference herein.

BACKGROUND OF THE INVENTION

The present invention is generally related to the script logic, and more specifically, to real time feedback of script logic.

A contact center is a group of trained agents or technicians that are required to use a telephone and computer to perform their duties. Integration of voice (telephone) and data (PC) create an agent's desktop environment. A trend in contact center technology is the growing use of virtual contact centers which is based on the principle of employing contact center agents employees and contractors for the completion of contact center duties from their home or other remote location (i.e. working in general local office suites also referred to as hotel workers). Virtual contact center agents require reliable network interconnectivity to a Public Switched Telephone Network (PSTN) and Internet Protocol (IP) networks, for example. The contact center provider must provide or publish the services and tools to perform: agent authentication, encryption (secure data during transport), and relevant third party application interfaces to complete the contact center agent duties. Clients employ contact center providers to perform their customer contact duties. Customers are those individuals that use some form of communication (telephone, email, instant message and fax, for example).

To increase call center customer satisfaction, agents must have accurate timely information and must respond quickly. This timely and accurate response by the agent is enabled by continuous flow of information to and from the agent in the form of a script. The script allows the agent to handle objections, answer questions and gather information in an efficient process. The script is comprised of individual panels which have instructions, information and data queries. This set of panel instructions, information and data queries are referred to as panel logic. The panels themselves are "tied" together depending upon the questions asked and information required. This panel to panel linkage is referred to as branching logic and can tie a large variety of panels together in a dynamic fashion as the need arises. Panels tied together by branching logic form a script path. The information contained in the scripts requires a constant stream of data to and from the contact center. This data stream needs to have a high quality of service to in order to adequately service the customer.

Therefore, what is needed is a system, method, and computer readable medium for script logic optimization and debugging and for real time feedback of script logic.

SUMMARY OF THE INVENTION

The present invention provides an ability to provide feedback of script logic used by a call center. The effectiveness of a script is largely assumed when placed in service and at present there are no effective immediate quality feedback mechanisms.

The present invention graphically outputs the number of agents utilizing any one panel at a time and the average length of time spent on that panel, additionally the number of callers lost per panel is tallied to determine weak links in the script logic. By identifying which panels take the most time to get through, updates to those panels may be identified to simplify the logic or the instructions associated with that panel. By identifying which panels have the greatest number of customer losses, updates to the panels may be identified to correct the script logic for those panels and those updates can be incorporated in real-time and further updated in real-time.

The present invention may comprise a web interface or other ability to provide real-time feedback of the quantity and disposition of agents progressing through the panels. Agents may be represented by dots and a plurality of agents on a single panel can be represented by larger circles. This type of interface can provide insight to the effectiveness of mass media or marketing campaigns. Real-time graphs and indicators may provide additional immediate sale and no sale criteria.

In one embodiment of the present invention, a real time feedback of script logic comprises, counting at least one agent utilizing at least one panel associated with at least one caller, establishing an average length of time required to utilize the at least one panel associated with the at least one caller, tallying a number of callers terminating interaction during utilization of the at least one panel, calculating statistics associated with the counted agents per panel, the established average length of time required per panel and the tallied number of callers terminating interaction per panel, and displaying the calculated statistics. The method may also comprise requesting feedback on the at least one panel from the at least one agent upon the caller terminating interaction, collecting the requested feedback associated with the at least one panel, sending the collected requested feedback, developing a test panel, creating a test panel detour in a branching logic, rerouting a subset of at the least one agents to the test panel, measuring an average length of time required to utilize the test panel, determining a difference in the measured average length of time required to utilize the test panel and the established average length of time to utilize the at least one panel, enumerating a number of callers terminating interaction during utilization of the test panel, detecting a change in the enumerated number of callers terminating interaction during utilization of the test panel and the tallied number of callers terminating interaction during utilization of the at least one panel and updating a branching logic to route agents to the test panel.

In a further embodiment of the present invention, a computer readable medium (or software) comprises instructions for tallying a number of callers terminating interaction during utilization of at least one panel associated with at least one caller, requesting feedback on the at least one panel from at least one agent upon the caller terminating interaction, collecting requested feedback associated with the at least one panel and sending the collected requested feedback. The computer readable medium may also comprise instructions for developing a test panel, creating a test panel detour in a branching logic, rerouting a subset of the at least one agents to the test panel, enumerating a number of callers terminating interaction during utilization of the test panel, detecting a change in the enumerated number of callers terminating interaction during utilization of the test panel and the tallied number of callers terminating interaction during utilization of the at least one panel, establishing an average length of time required to utilize the at least one panel associated with the at least one caller, measuring an average length of time required to utilize the test panel, and determining a difference in the measured average length of time required to utilize the test panel and the established average length of time to utilize the at least one panel.

In yet a further embodiment, a system for real time feedback of script logic comprises a processor that tallies a number of callers terminating interaction during utilization of at least one panel, develops a test panel, creates a test panel detour in a branching logic, reroutes a subset of at least one agents to the test panel, enumerates a number of callers terminating interaction during utilization of the test panel, detects a change in the enumerated number of callers terminating interaction during utilization of the test panel and the tallied number of callers terminating interaction during utilization of the at least one panel and updates a branching logic to route agents to the test panel if the detected change shows less terminated callers utilizing the test panel, and a memory communicably coupled to the processor, wherein the memory stores the test panel and the updated branching logic. The system processor may also request feedback on the at least one panel from at least one agent upon the caller terminating interaction, collect the requested feedback associated with the at least one panel, and send the collected requested feedback, establish an average length of time required to utilize the at least one panel associated with at least one caller, measure an average length of time required to utilize the test panel, determine a difference in the measured average length of time required to utilize the test panel and the established average length of time to utilize the at least one panel, and calculate statistics associated with the at least one panel tallied number of callers terminating interaction and the enumerated number of callers terminating interaction during utilization of the test panel.

DETAILED DESCRIPTION OF THE INVENTION

Figure 1:
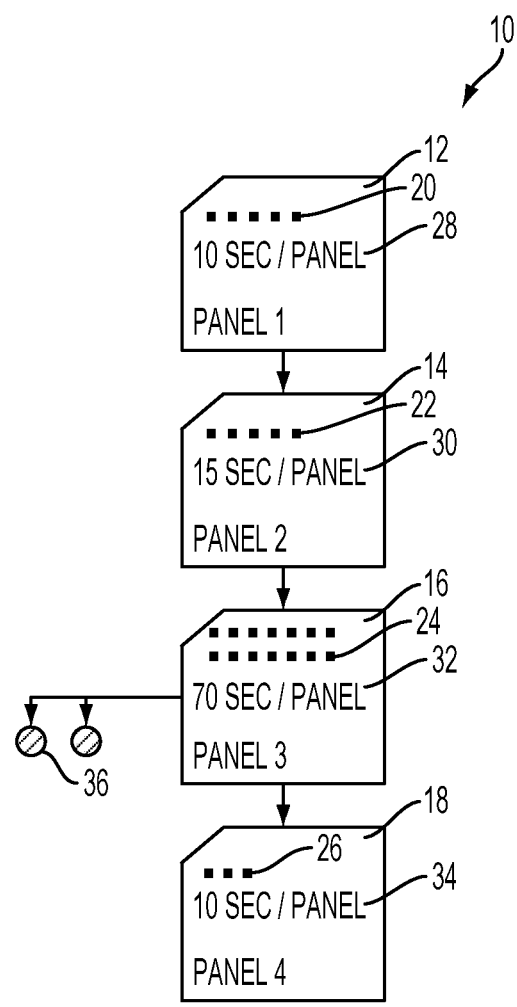
FIG. 1 depicts a first block diagram of real time feedback of script logic in accordance with a preferred embodiment of the present invention.

Referring now to FIG. 1, a first block diagram of the real time feedback of script logic 10 is depicted and comprises a number of blocks or modules that are software, hardware, firmware, and/or the combination of software, hardware, and/or firmware. Panels 12, 14, 16, 18 each show graphically the number of agents 20, 22, 24, 26 accessing the panel and the average time 28, 30, 32, 34 per spent accessing each panel by the agent. The number of callers terminating interaction with the agent per panel 36 is shown.

Figure 2:
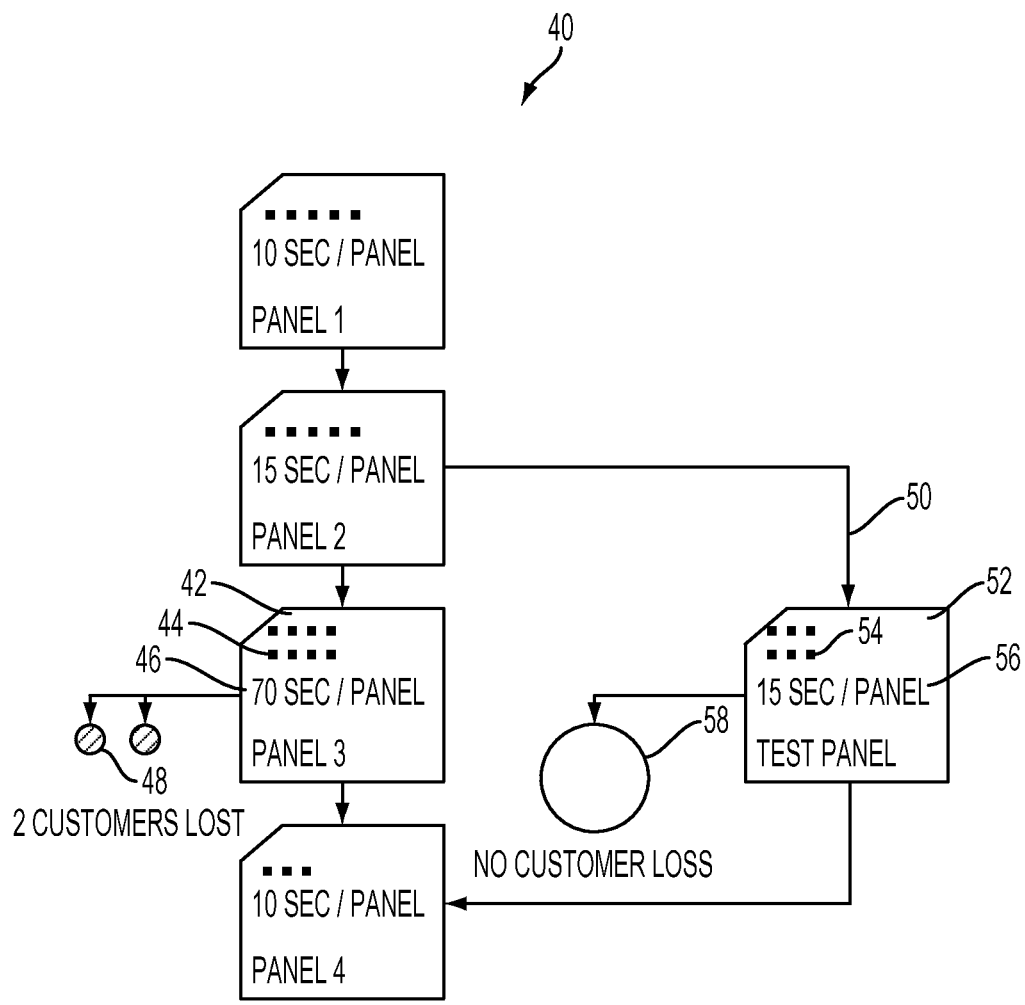
FIG. 2 depicts a second block diagram of real time feedback of script logic in accordance with a preferred embodiment of the present invention.

Referring now to FIG. 2, a second block diagram of the real time feedback of script logic 40 is depicted and comprises a number of blocks or modules that are software, hardware, or firmware, and/or the combination of software, hardware, and/or firmware. The original panel 42 shows the number of agents accessing the panel 44, the average time spent on the panel 46 and the number of callers terminating interaction 48 while accessing that specific panel. A test panel detour 50 in a branching logic connects the test panel 52 to the branching logic. The number of agents accessing the test panel 54 and the average time spent on the panel 56 as well as the number of callers terminating interaction 58 while utilizing the test panel are shown.

Figure 3:
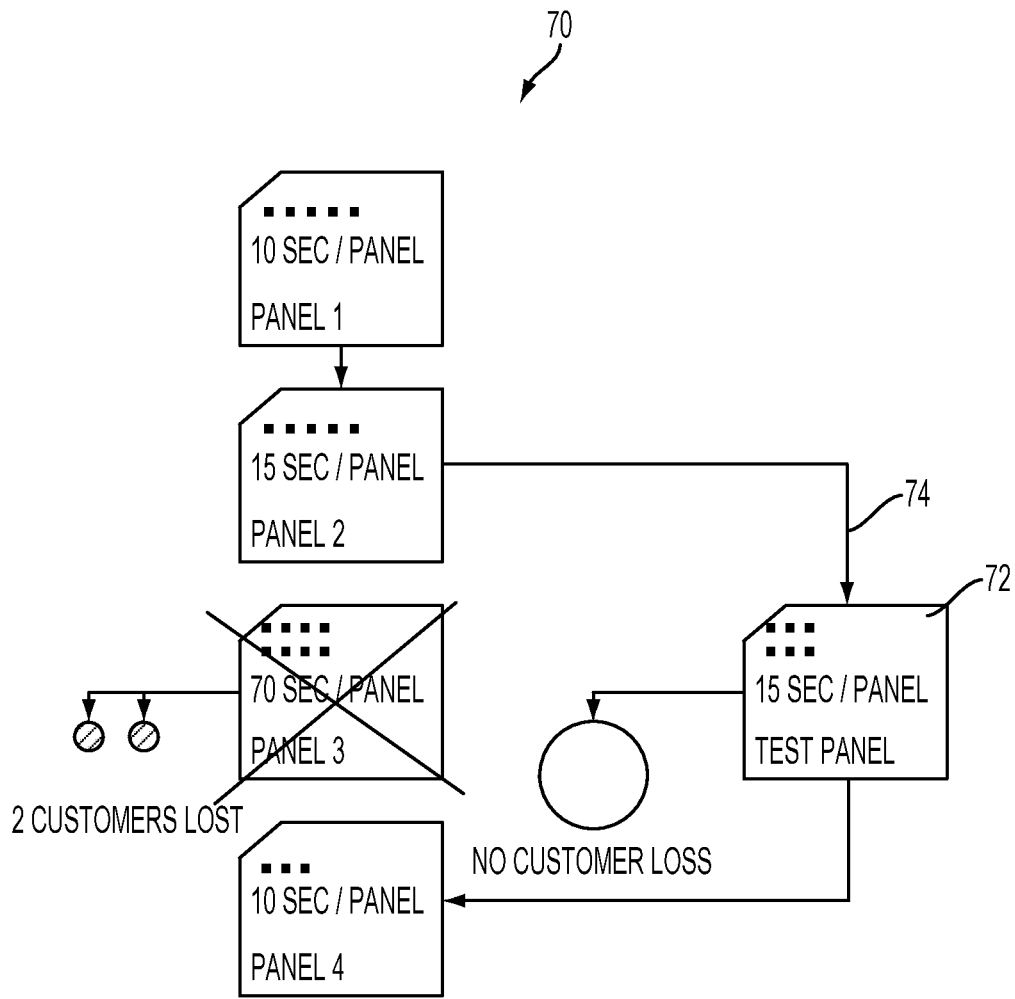
FIG. 3 depicts a third block diagram of real time feedback of script logic in accordance with a preferred embodiment of the present invention.

Referring now to FIG. 3, a third block diagram of the real time feedback of script logic 70 is depicted and comprises a number of blocks or modules that are software, hardware, or firmware, and/or the combination of software, hardware, and/or firmware. After the test panel has been shown to work more efficiently than the original panel the branching logic 74 replaces the original branching logic and connects the test panel 72 into the script.

Figure 4:
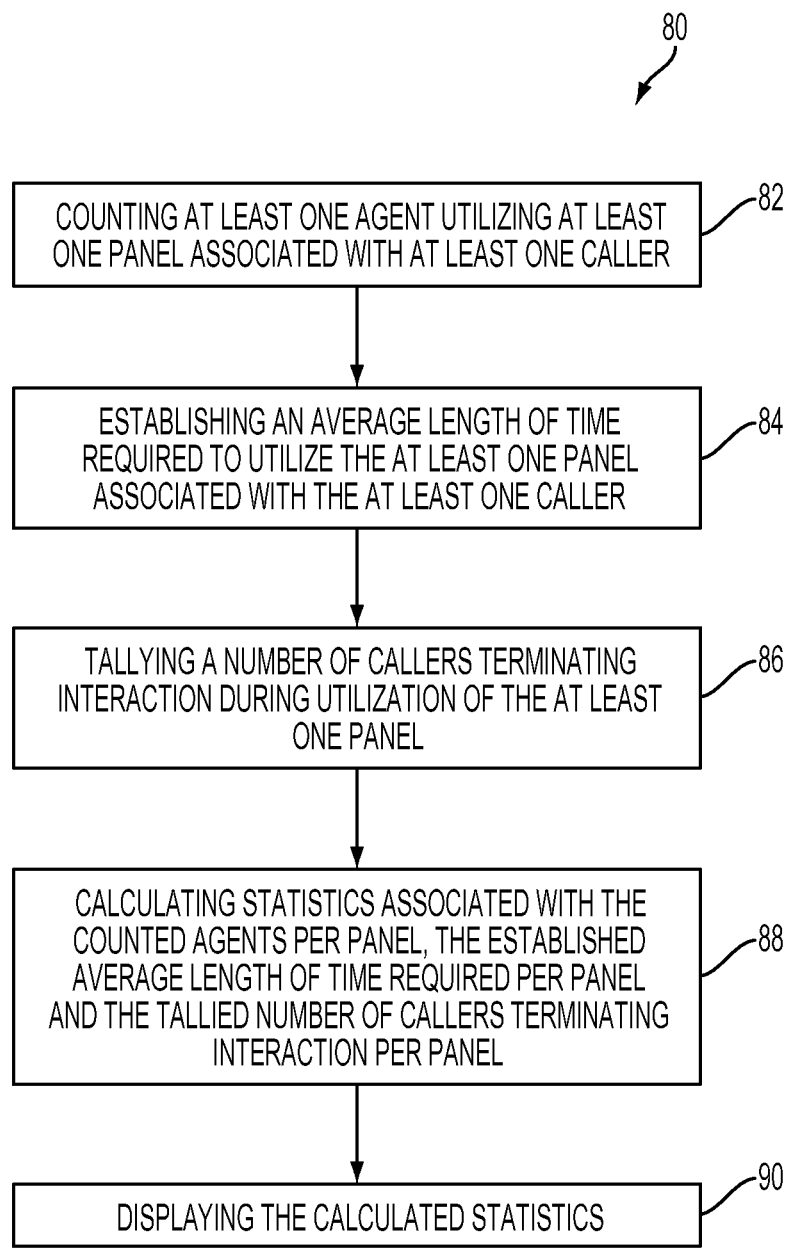
FIG. 4 depicts a first method of real time feedback of script logic in accordance with a preferred embodiment of the present invention.

Referring now to FIG. 4, a first method of real time feedback of script logic 80 is depicted. The method comprises counting 82 at least one agent utilizing at least one panel associated with at least one caller, establishing 84 an average length of time required to utilize the at least one panel associated with the at least one caller, tallying 86 a number of callers terminating interaction during utilization of the at least one panel, calculating 88 statistics associated with the counted agents per panel, the established average length of time required per panel and the tallied number of callers terminating interaction per panel, and displaying 90 the calculated statistics. The method is performed by software, hardware, or firmware, and/or the combination of software, hardware, and/or firmware.

Figure 5:
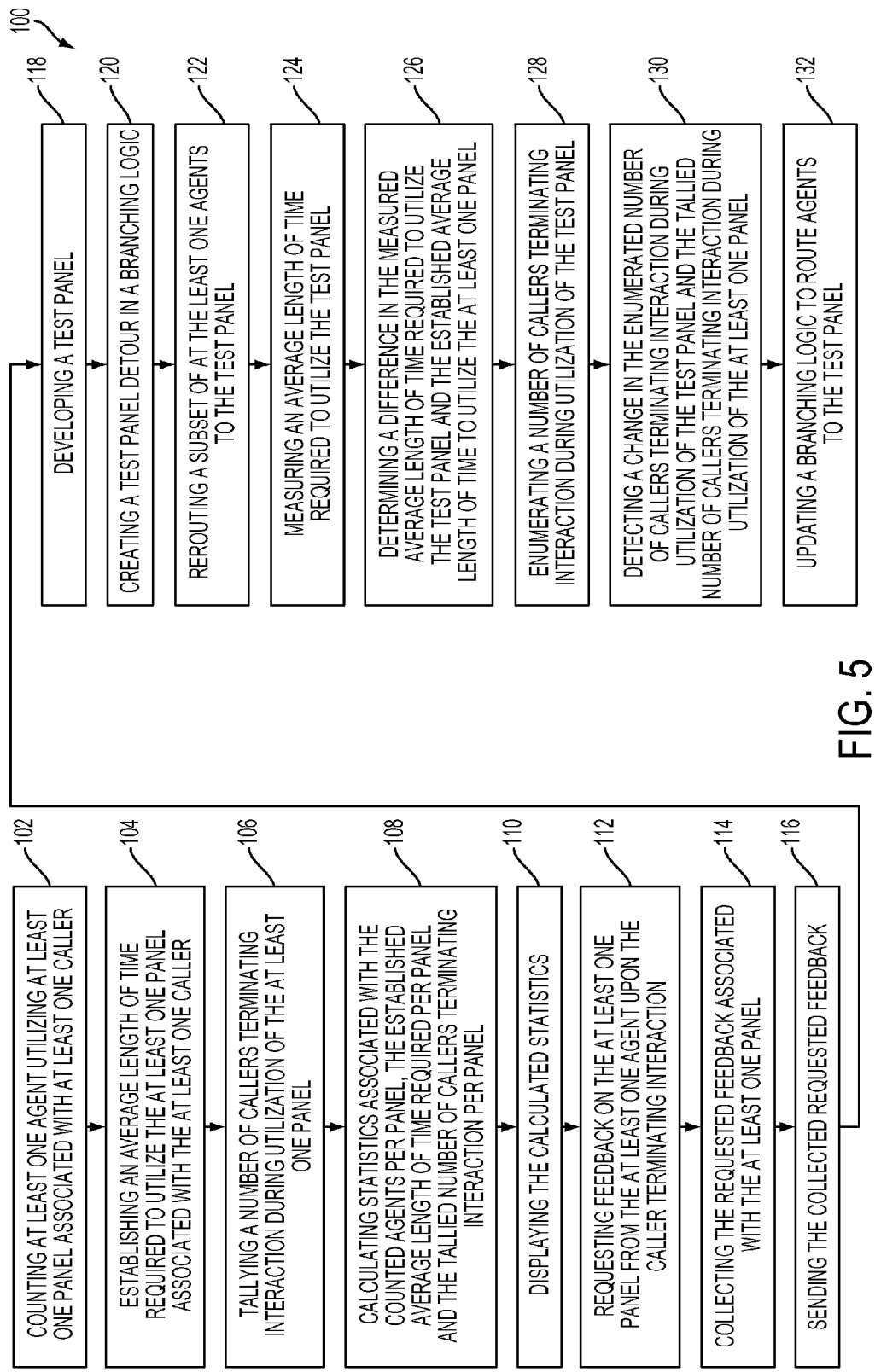
FIG. 5 depicts a second method of real time feedback of script logic in accordance with a preferred embodiment of the present invention.

Referring now to FIG. 5, a second method of real time feedback of script logic 100 is depicted. The method comprises counting 102 at least one agent utilizing at least one panel associated with at least one caller, establishing 104 an average length of time required to utilize the at least one panel associated with the at least one caller, tallying 106 a number of callers terminating interaction during utilization of the at least one panel, calculating 108 statistics associated with the counted agents per panel, the established average length of time required per panel and the tallied number of callers terminating interaction per panel, and displaying 110 the calculated statistics. The method may also comprise requesting 112 feedback on the at least one panel from the at least one agent upon the caller terminating interaction, collecting 114 the requested feedback associated with the at least one panel, sending 116 the collected requested feedback, developing 118 a test panel, creating 120 a test panel detour in a branching logic, rerouting 122 a subset of at least one agents to the test panel, measuring 124 an average length of time required to utilize the test panel, determining 126 a difference in the measured average length of time required to utilize the test panel and the established average length of time to utilize the at least one panel, enumerating 128 a number of callers terminating interaction during utilization of the test panel, detecting 130 a change in the enumerated number of callers terminating interaction during utilization of the test panel and the tallied number of callers terminating interaction during utilization of the at least one panel and updating 132 a branching logic to route agents to the test panel. The method is performed by software, hardware, or firmware, and/or the combination of software, hardware, and/or firmware.

Figure 6:
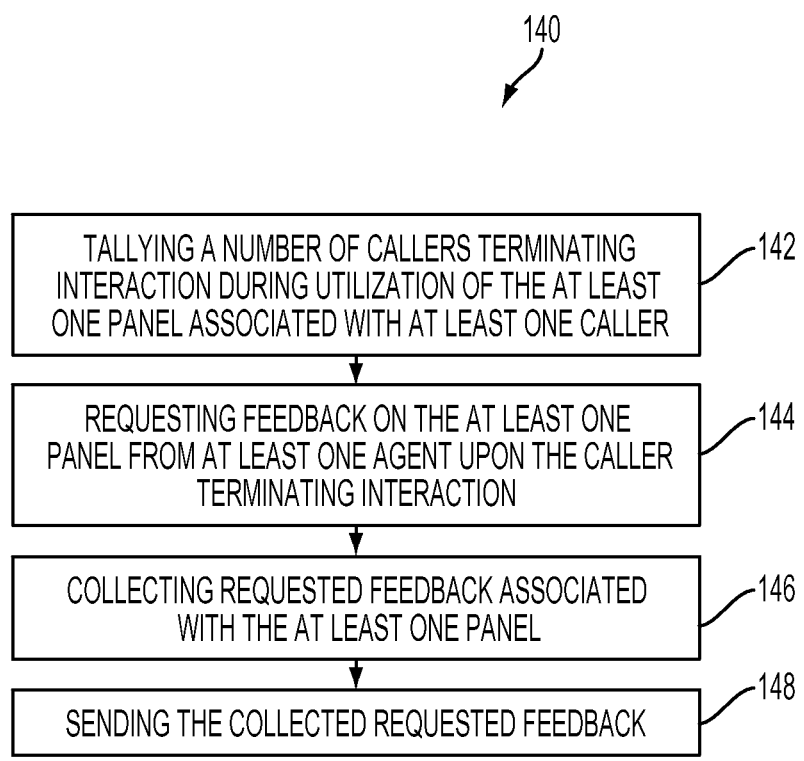
FIG. 6 depicts a first software flow block of real time feedback of script logic in accordance with a preferred embodiment of the present invention.

Referring now to FIG. 6, a first software block diagram of real time feedback of script logic 140 is depicted. A computer readable medium comprises instructions for tallying 142 a number of callers terminating interaction during utilization of at least one panel associated with at least one caller, requesting 144 feedback on the at least one panel from at least one agent upon the caller terminating interaction, collecting 146 requested feedback associated with the at least one panel and sending 148 the collected requested feedback. This method is preferably embodied in a computer readable medium or software but may also be embodied in firmware and is utilized via hardware. The transfer of information occurs via at least one of a wireless protocol, a wired protocol and a combination of the wireless protocol and the wired protocol. The steps performed in this figure are performed by software, but may also be performed by hardware or firmware, and/or the combination of software, hardware, and/or firmware.

Figure 7:
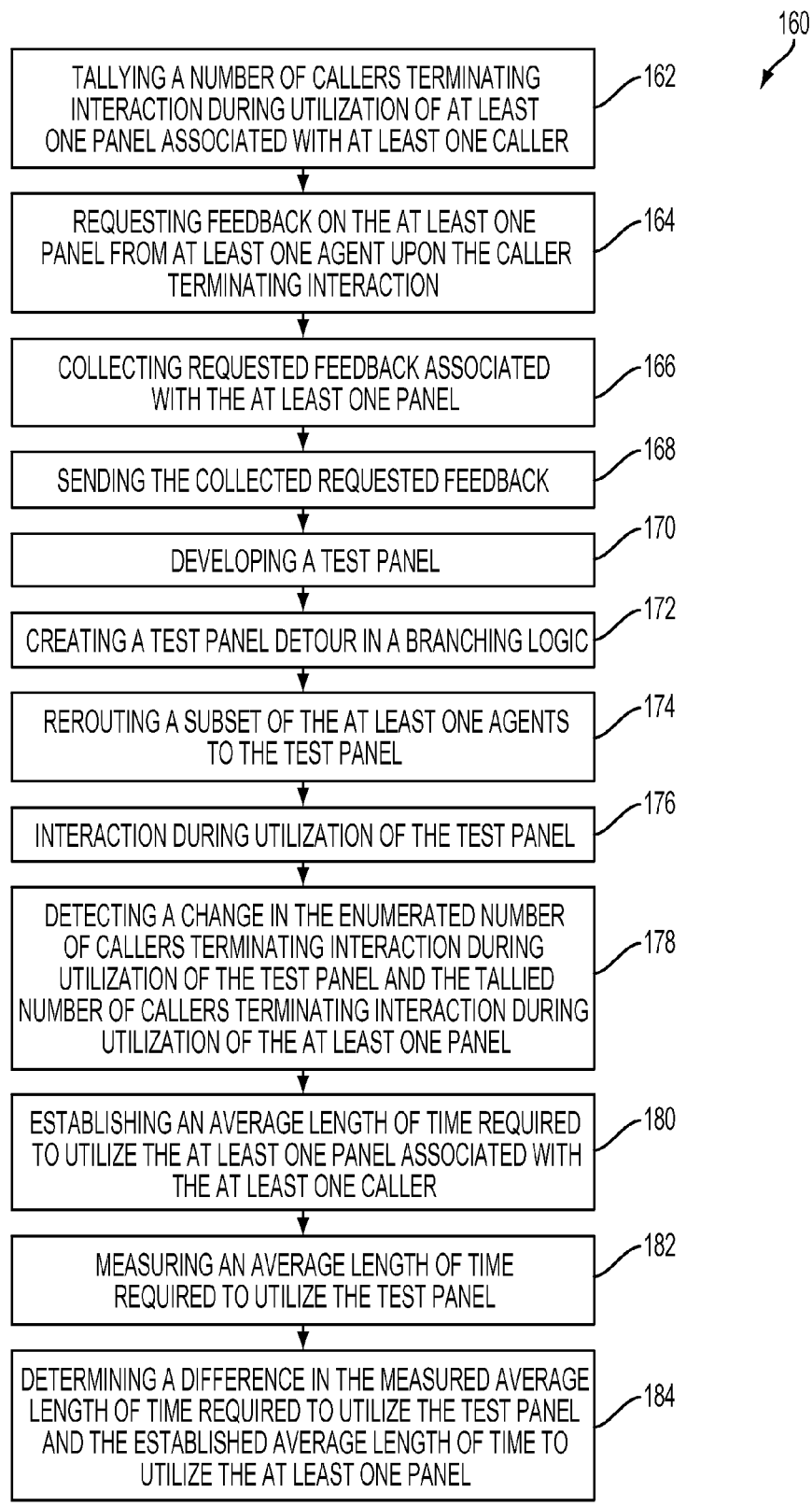
FIG. 7 depicts a second software flow block of real time feedback of script logic in accordance with a preferred embodiment of the present invention.

Referring now to FIG. 7, a second software block diagram of real time feedback of script logic 160 is depicted. A computer readable medium comprises instructions for tallying 162 a number of callers terminating interaction during utilization of at least one panel associated with at least one caller, requesting 164 feedback on the at least one panel from at least one agent upon the caller terminating interaction, collecting 166 requested feedback associated with the at least one panel and sending 168 the collected requested feedback. The computer readable medium may also comprise instructions for developing 170 a test panel, creating 172 a test panel detour in a branching logic, rerouting 174 a subset of the at least one agents to the test panel, enumerating 176 a number of callers terminating interaction during utilization of the test panel, detecting 178 a change in the enumerated number of callers terminating interaction during utilization of the test panel and the tallied number of callers terminating interaction during utilization of the at least one panel, establishing 180 an average length of time required to utilize the at least one panel associated with the at least one caller, measuring 182 an average length of time required to utilize the test panel, and determining 184 a difference in the measured average length of time required to utilize the test panel and the established average length of time to utilize the at least one panel. This method is preferably embodied in a computer readable medium or software but may also be embodied in firmware and is utilized via hardware. The transfer of information occurs via at least one of a wireless protocol, a wired protocol and a combination of the wireless protocol and the wired protocol. The steps performed in this figure are performed by software, but may also be performed by hardware or firmware, and/or the combination of software, hardware, and/or firmware.

Figure 8:
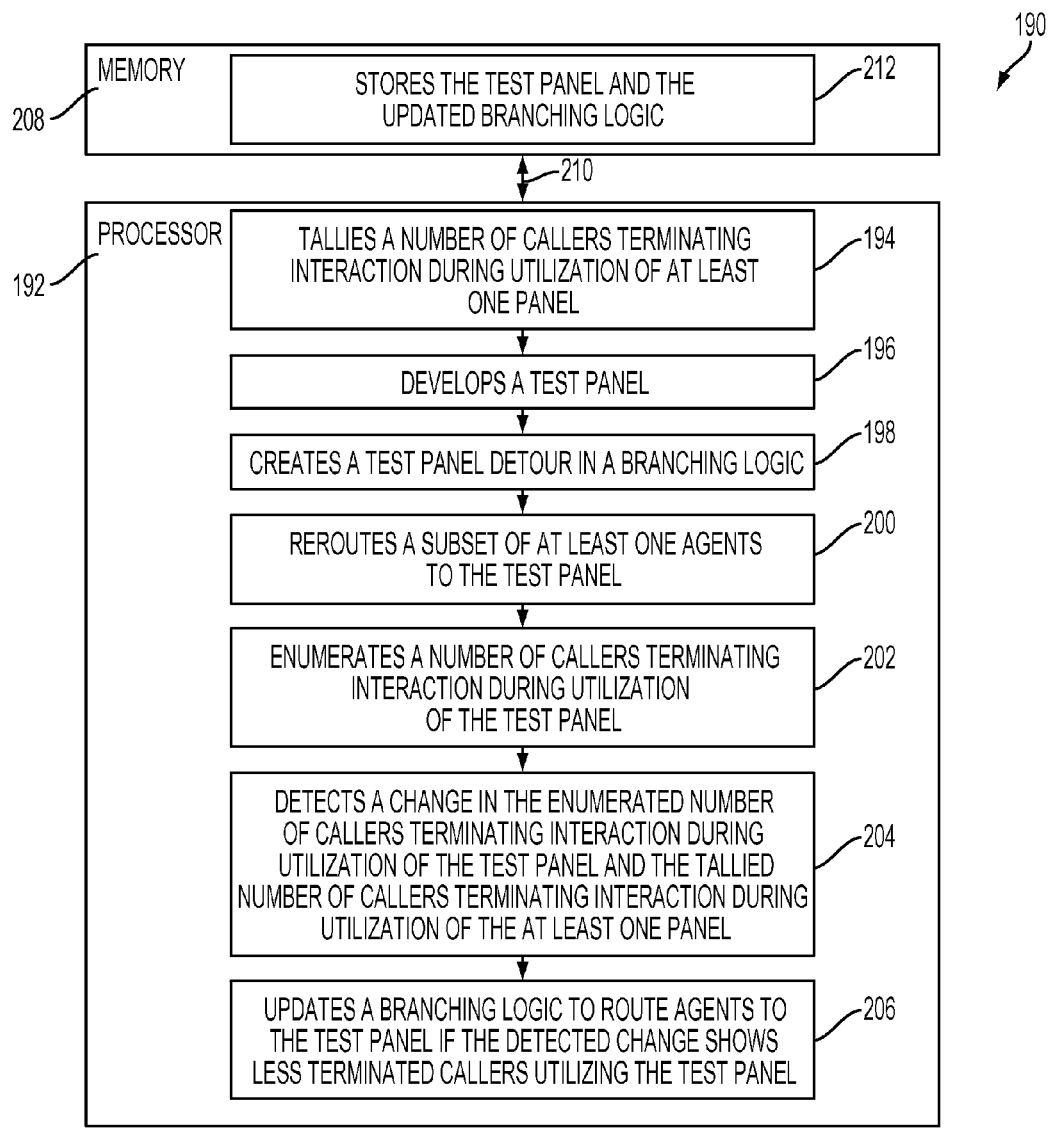
FIG. 8 depicts a first system of real time feedback of script logic in accordance with a preferred embodiment of the present invention.

Referring now to FIG. 8, a first system of real time feedback of script logic 190 is depicted. The system comprises a processor 192 that tallies 194 a number of callers terminating interaction during utilization of at least one panel, develops 194 a test panel, creates 198 a test panel detour in a branching logic, reroutes 200 a subset of at least one agents to the test panel, enumerates 202 a number of callers terminating interaction during utilization of the test panel, detects 204 a change in the enumerated number of callers terminating interaction during utilization of the test panel and the tallied number of callers terminating interaction during utilization of the at least one panel and updates 206 a branching logic to route agents to the test panel if the detected change shows less terminated callers utilizing the test panel, and a memory 208 communicably coupled 210 to the processor, wherein the memory stores 212 the test panel and the updated branching logic. The transfer of information between the processor and the memory occurs via at least one of a wireless protocol, a wired protocol and a combination of the wireless protocol and the wired protocol. The steps performed in this figure are performed by software, hardware, or firmware, and/or the combination of software, hardware, and/or firmware.

Figure 9A:
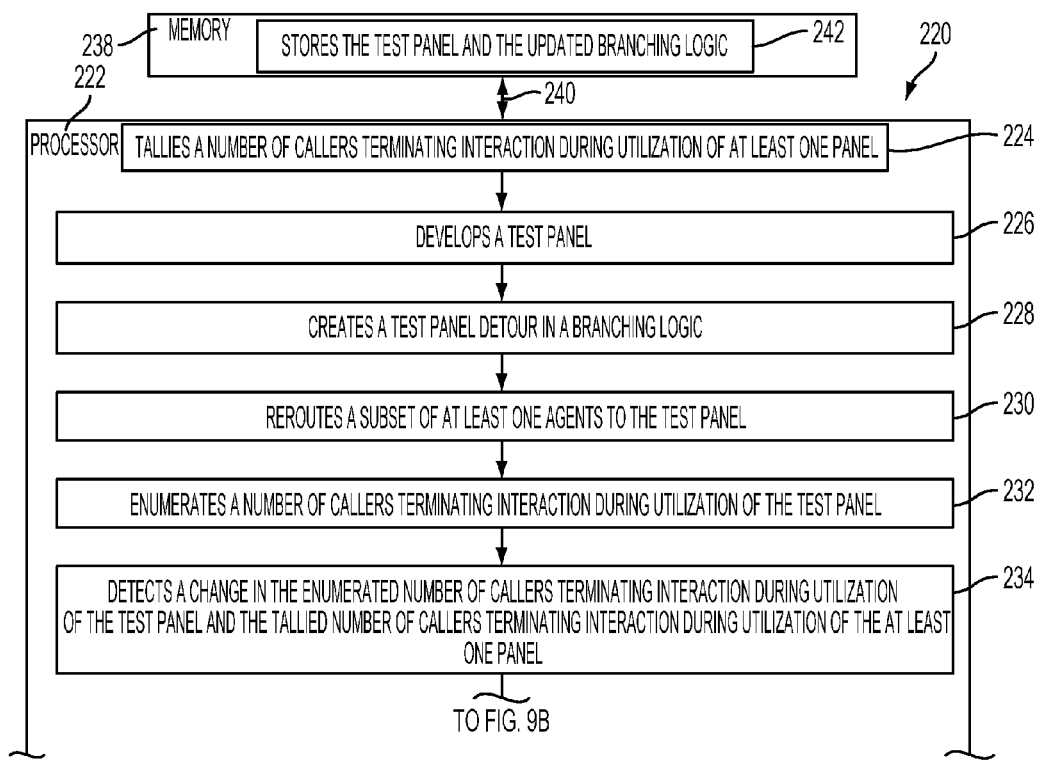
FIGS. 9A & 9B depict a second system of real time feedback of script logic in accordance with a preferred embodiment of the present invention.
Figure 9B:
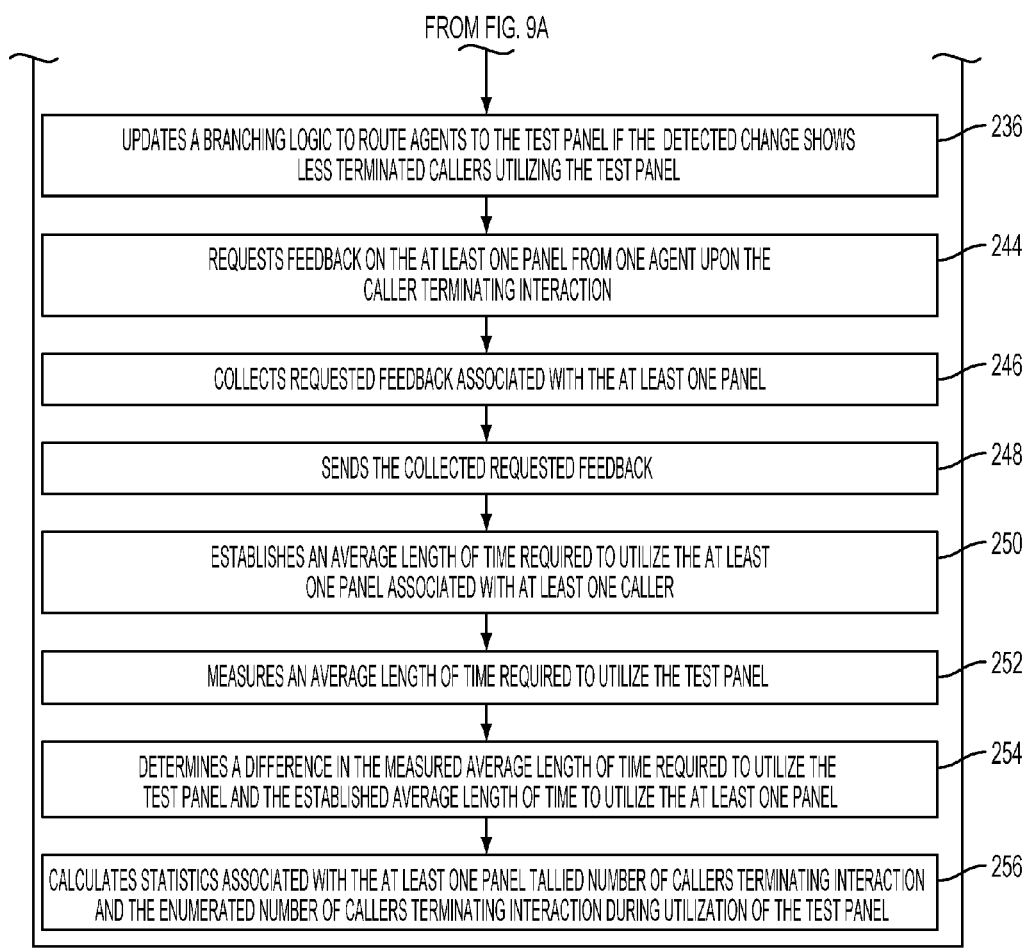

Referring now to FIG. 9, a second system of real time feedback of script logic 220 is depicted. The system comprises a processor 222 that tallies 224 a number of callers terminating interaction during utilization of at least one panel, develops 226 a test panel, creates 228 a test panel detour in a branching logic, reroutes 230 a subset of at least one agents to the test panel, enumerates 232 a number of callers terminating interaction during utilization of the test panel, detects 234 a change in the enumerated number of callers terminating interaction during utilization of the test panel and the tallied number of callers terminating interaction during utilization of the at least one panel and updates 236 a branching logic to route agents to the test panel if the detected change shows less terminated callers utilizing the test panel, and a memory 238 communicably coupled 240 to the processor, wherein the memory stores 242 the test panel and the updated branching logic. The system processor may also request 244 feedback on the at least one panel from at least one agent upon the caller terminating interaction, collect 246 the requested feedback associated with the at least one panel, and send 248 the collected requested feedback, establish 250 an average length of time required to utilize the at least one panel associated with at least one caller, measure 252 an average length of time required to utilize the test panel, determine 254 a difference in the measured average length of time required to utilize the test panel and the established average length of time to utilize the at least one panel, and calculate 256 statistics associated with the at least one panel tallied number of callers terminating interaction and the enumerated number of callers terminating interaction during utilization of the test panel. The transfer of information between the processor and the memory occurs via at least one of a wireless protocol, a wired protocol and a combination of the wireless protocol and the wired protocol. The steps performed in this figure are performed by software, hardware, or firmware, and/or the combination of software, hardware, and/or firmware.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the processors or memories. Also, these capabilities may be performed in the current manner or in a distributed manner and on, or via, any device able to provide and/or receive broadband signals. Further, although depicted in a particular manner, various modules or blocks may be repositioned without departing from the scope of the current invention. Still further, although depicted in a particular manner, a greater or lesser number of processors, memories and internet protocol inter-network connections can be utilized with the present invention in order to accomplish the present invention, to provide additional known features to the present invention, and/or to make the present invention more efficient.

What is claimed is:

1. A method, comprising:
    calculating per panel statistics for a plurality of panels of a script, the per panel statistics comprising an average utilization time per panel by a plurality of agents and a number of callers terminating interaction with the plurality of agents during utilization per panel;
    developing a test panel as a different and alternative panel for an original panel of the plurality of panels via a processor and storing the test panel in memory;
    substituting the test panel in place of the original panel comprising modifying branching logic of script logic of the script to create a branching logic detour in the script logic to the test panel and storing the modified branching logic in memory; and
    rerouting at least a subset of the plurality of agents to the test panel using the branching logic detour.

2. The method of claim 1 comprising requesting feedback on the at least one panel from at least one agent of the plurality of agents upon the caller terminating interaction.

3. The method of claim 2 comprising collecting the requested feedback associated with the at least one panel.

4. The method of claim 3 comprising sending the collected requested feedback.

5. The method of claim 1, comprising displaying the calculated statistics.

6. The method of claim 1, wherein calculating per panel statistics for a given panel of the plurality of panels comprises measuring the measured time taken for an agent of a plurality of agents to utilize the given panel for a call.

7. The method of claim 1, wherein calculating per panel statistics for a given panel of the plurality of panels comprises averaging the measured time for a plurality of agents and a plurality of calls to produce the average utilization time for the given panel.

8. The method of claim 1 comprising measuring an average length of time required to utilize the test panel.

9. The method of claim 8 comprising determining a difference in the measured average length of time required to utilize the test panel and the established average length of time to utilize the original panel.

10. The method of claim 1 comprising enumerating a number of callers terminating interaction during utilization of the test panel.

11. The method of claim 10 comprising detecting a change between the enumerated number of callers terminating interaction during utilization of the test panel and the tallied number of callers terminating interaction during utilization of the original panel.

12. The method of claim 11 comprising updating a branching logic to route all of the plurality of agents to the test panel.

13. A non-transitory computer readable storage medium comprising instructions that when executed cause a processor to perform:
    calculating per panel statistics for a plurality of panels of a script, the per panel statistics comprising tallying a number of callers terminating interaction with a plurality of agents during utilization of a given panel;
    collecting feedback on the given panel from at least one agent upon a caller of the number of callers terminating interaction;
    developing a test panel as a different and alternative panel for an original panel of the plurality of panels and storing the test panel in memory;
    creating a test panel detour in a branching logic of script logic of the script and storing a modified script logic in memory; and
    rerouting a subset of the plurality of agents to the test panel based on the modified script logic.

14. The non-transitory computer readable storage medium of claim 13 that when executed cause the processor to further perform:
    enumerating a number of callers terminating interaction during utilization of the test panel; and
    detecting a change between the enumerated number of callers terminating interaction during utilization of the test panel and the tallied number of callers terminating interaction during utilization of the original panel.

15. The non-transitory computer readable storage medium of claim 13 that when executed cause the processor to further perform:
    establishing an average length of time required to utilize the original panel;
    measuring an average length of time required to utilize the test panel; and
    determining a difference in the measured average length of time required to utilize the test panel and the established average length of time to utilize the original panel.

16. An apparatus, comprising:
    a processor, wherein the processor:
        tallies a number of callers terminating interaction during utilization of an original panel of a script;
        develops a test panel different from the original panel;
        enumerates a number of callers terminating interaction during utilization of the test panel;
        detects a change in the enumerated number of callers terminating interaction during utilization of the test panel and the tallied number of callers terminating interaction during utilization of the original panel; and
        updates a branching logic of the script to route agents to the test panel when the detected change shows less terminated callers utilizing the test panel; and
    a memory communicably coupled to the processor, wherein the memory stores the test panel and the updated branching logic.

17. The apparatus of claim 16 wherein the processor:
    requests feedback on the original panel from at least one agent upon the caller terminating interaction;
    collects requested feedback associated with the original panel; and
    sends the collected requested feedback.

18. The apparatus of claim 16 wherein the processor:
establishes an average length of time required to utilize the original panel associated with at least one caller;
measures an average length of time required to utilize the test panel; and
determines a difference in the measured average length of time required to utilize the test panel and the established average length of time to utilize the original panel.

19. The apparatus of claim 17 wherein the processor calculates statistics associated with the original panel tallied number of callers terminating interaction.

20. The apparatus of claim 17 wherein the processor calculates statistics associated with the enumerated number of callers terminating interaction during utilization of the test.

* * * * *